(12) United States Patent
Desai

(10) Patent No.: US 12,724,678 B2
(45) Date of Patent: Sep. 1, 2026

(54) FAILURE RECOVERY IN A REPLICATION ENVIRONMENT USING A VECTOR CLOCK

(71) Applicant: Dell Products L.P., Round Rock, TX (US)

(72) Inventor: Keyur B. Desai, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/957,598

(22) Filed: Nov. 22, 2024

(65) Prior Publication Data

US 2026/0147675 A1 May 28, 2026

(51) Int. Cl.
*G06F 11/1492* (2026.01)
*G06F 11/16* (2006.01)

(52) U.S. Cl.
CPC ...... *G06F 11/1492* (2013.01); *G06F 11/1658* (2013.01); *G06F 2201/84* (2013.01); *G06F 2201/865* (2013.01)

(58) Field of Classification Search
CPC ............. G06F 11/1492; G06F 11/1658; G06F 2201/84; G06F 2201/865
See application file for complete search history.

(56) References Cited

U.S. PATENT DOCUMENTS 11,436,110 B2 * 9/2022 Zhang .................. G06F 16/273
11,789,971 B1 * 10/2023 Kuppahally ........ G06F 16/2365 707/634
11,892,975 B1 * 2/2024 Rubin-Smith .......... G06F 3/065
2023/0342269 A1 * 10/2023 Desai .................. G06F 11/2097

* cited by examiner

*Primary Examiner* — Joseph R Kudirka
(74) *Attorney, Agent, or Firm* — Workman Nydegger

(57) ABSTRACT

One example method includes performing replication operations and/or failure recovery operations for replication operations in a computing system using vector clocks. Each node or process in a computing system is associated with a vector clock that reflects streams available at nodes. As the replication operation is performed, the vector clocks are updated. When a failure is detected or when insufficient streams are available, the nodes may be throttled until sufficient streams are available. The vector clocks facilitate a recovery line such that replication can resume when sufficient streams are available.

20 Claims, 5 Drawing Sheets

FAILURE RECOVERY IN A REPLICATION ENVIRONMENT USING A VECTOR CLOCK

FIELD OF THE INVENTION

Embodiments of the present invention generally relate to failure recovery. More particularly, at least some embodiments of the invention relate to systems, hardware, software, computer-readable media, and methods for replication and/or replication failure recovery in computing systems, including distributed computing systems.

BACKGROUND

Replication is often performed in distributed systems. Unfortunately, replication may fail for a variety of reasons, particularly in systems that employ multiple-stream replication. Replication failure may occur, for example, when the source node and/or destination node do not have sufficient resources (e.g., streams) to support the streams required for the replication operations. Replication failure may also occur when a node is repaired or replaced.

When replication failure occurs or is detected, the replication failure is resolved, conventionally, by performing a failure recovery operation. This may include restarting the replication operation from the point of failure. This ensures that the replication operation is properly performed, and that data is successfully replicated without loss. More specifically, conventional recovery operations rely on synchronized clocks. Synchronized clocks may allow the point of failure to be identified. However, synchronized clocks are difficult to maintain, require substantial overhead to synchronize the clocks, and are, in any event, inherently inaccurate.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
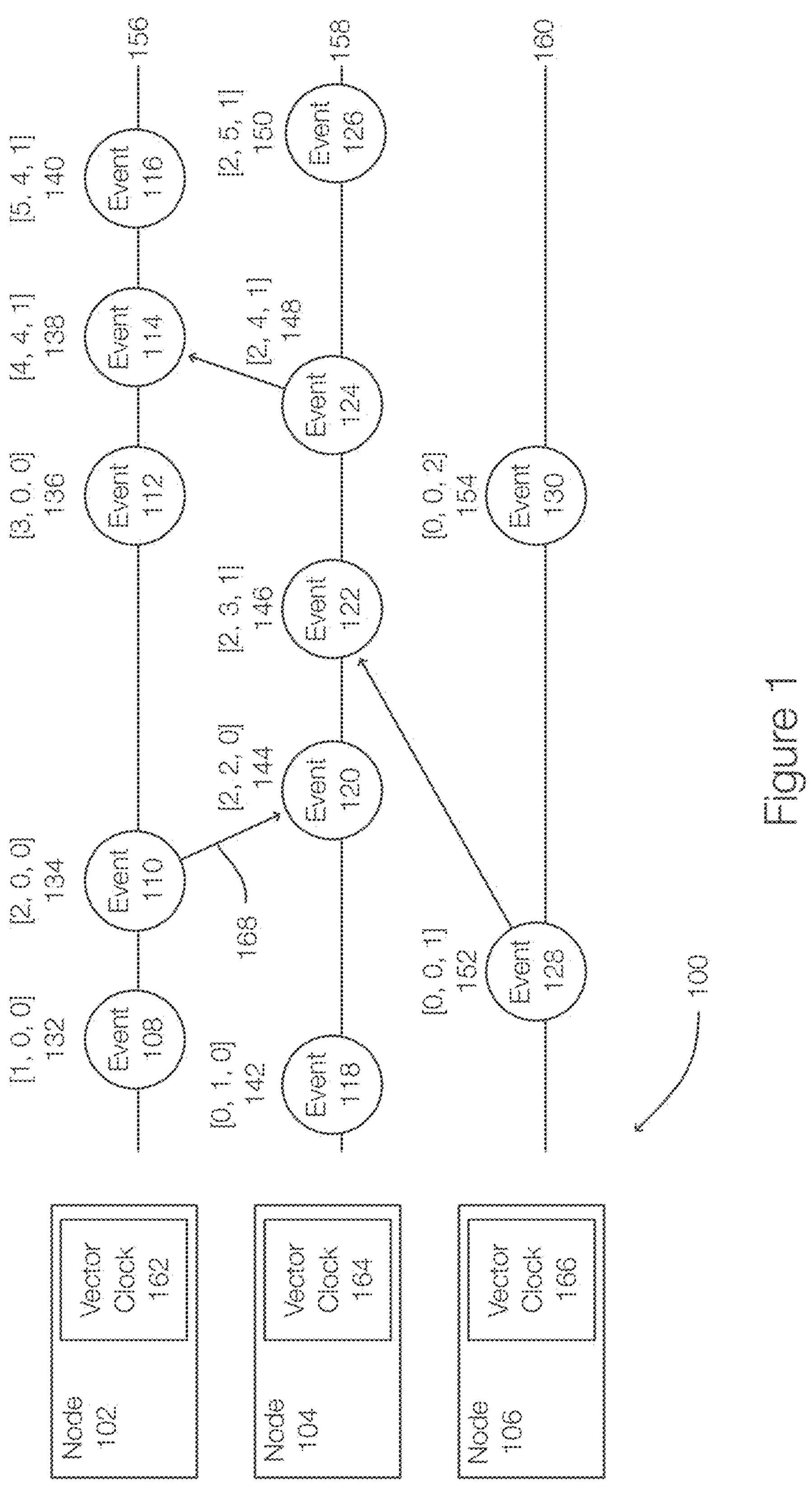
FIG. 1 discloses aspects of a vector clock and of updating a vector clock in a distributed computing system.

Embodiments of the present invention generally relate performing applications and performing application failure recovery in distributed computing systems. More particularly, at least some embodiments of the invention relate to systems, hardware, software, computer-readable media, and methods for replication failure recovery in distributed systems.

In general, example embodiments of the invention further relate to distributed and/or scaleout operations, recovery operations, logical clock operations, vector clock operations, replication operations, write operations, read operations, copy operations, or the like or combination thereof. Embodiments of the invention are further discussed in the context of replication, but are not limited thereto.

In a distributed system, it is often unnecessary to know when an event happened in a global context. Rather than using a physical time or clock, the order of events in the distributed system may be used as a clock. In some examples, it is only necessary to know the order of certain events, such as those visible to a particular node.

Embodiments of the invention relate to a vector logical clock (vector clock) and to various operations using the vector clock. Each node in a distributed system may be associated with a vector clock. A vector clock, by way of example, includes an entry for each node of a computing system. Each of the entries is a logical clock for a corresponding node. Thus, the vector clock is a vector of logical clocks for each node in the distributed system in one example.

Embodiments of the invention use the vector clocks to perform jobs (e.g., replication jobs), detect replication failure, and the like. However, the vector clocks are not necessarily synchronized. Rather, the vector clocks are updated based on events that occur at the nodes and/or between nodes. For example, a node may experience an event and update its own vector clock. However, other vector clocks at other nodes are not necessarily updated at the same time. Thus, the contents of the vector clocks present in the distributed computing system may be different.

In another example, every time an event occurs in the distributed system between two or more nodes, the sending node provides information describing what the sending node understands about the global state (its own logical clock) and information describing what the sending node understands about other nodes in the system (the other logical clocks in the sending node's vector clock). In other words, the sending nodes sends its vector clock to the destination node. This allows the destination node (but not necessarily all other nodes not associated with the message) to update its own vector clock.

Embodiments of the invention use vector clocks to perform replication failure recovery in a replication computing system that may include multiple nodes.

The ability to perform recovery operations should be a critical aspects of real-world computing systems. In order to prepare for a recovery operation, should one be necessary, backup operations are typically performed. For example, backup operations often include generating snapshots (or other backup types) and/or logging operations. These operations are examples of events.

Snapshots involve periodically saving the state of the process and logging typically involves recording the operations that produced the current state. Logging allows operations to be repeated if necessary during a recovery operation.

For example, a first node may fail and may need to be restored to a previous state. This may be referred to as a rollback operation. Once the first node has been rolled back to a valid previous state (e.g., using a snapshot), the first node may repeat the operations that had been performed between the previous state and the point or time of failure. This may include sending messages to other nodes. These repeated messages are duplicate messages. In addition, other nodes may have received messages that the first node being recovered does not "remember" sending. These messages are examples or orphan messages.

For the recovery operation to be successful, the other nodes must be able to tolerate the duplicate messages (e.g., idempotent operations), or detect and discard the duplicate messages. If the other nodes are unable to tolerate or handle the duplicate messages, the other nodes may also need to be rolled back to a previous state. Rolling back multiple nodes may cause additional issues because the rollback operations may orphan more messages and/or cause more duplicate messages.

More specifically, duplicate messages are illustrated in the context of an interaction between systems A and B as follows:

| System A | System B |
|---|---|
| 1) Event A → | |
| 2) Good Snapshot | |
| 3) Event B → | |
| 4) Event C → | |
| 5) System A failure. | |

In this example, after failure of system A at point 5, the system A may roll back to a good state (the snapshot at point 2). As system A rolls forward, event B and Event C are sent again to system B as system A rolls forward. Thus, events B and Care duplicate messages received by system B and should be handled in an idempotent manner. In other words, system B does the same thing in response to the events A and B that system B did the first time. Alternatively, system B may choose to discard event B and C.

Orphan messages are illustrated using the same scenario. In this case, between points 3 and 4, system A sends an additional event D to system B during the roll forward operation, which was not sent originally due to latencies or failure (point 5) that occurred before event D could be sent. In this case, the message of event D is an orphan message because the message was not sent originally and was sent during the recovery of system A. Because the event D may cause a state change in the system B, which was not intended, a cascaded rollback may be needed (e.g., system B may may need to be rolled back as well as system A to perform a full recovery).

Eventually the nodes will reach a state where the nodes can move forward together. This state is an example of a recovery line. After a failure, cooperating nodes may be required to rollback to a recovery line. Embodiments of the invention relate to identifying the recovery line in a distributed system using a vector clock.

Distributed processes and operations, such as resource synchronization, often depend on some method of ordering events to function. For example, consider a system with two processes (processes A and B) and a disk. The processes send messages to each other and send messages to the disk requesting access. The disk grants access in the order the messages were received.

For example, process A sends a message 1 to the disk requesting write access, and then sends a read instruction message 2 to process B. Process B receives the message 2 from process A and, as a result, sends a read request message 3 to the disk. Thus, messages 1 and 3 are both send to the disk.

If there is a timing delay causing the disk to receive both messages 1 and 3 at the same time, the disk can determine which message happened before the other message. Message 1 happens before message 3 if one can get [from, to] by a sequence of moves of two types: moving forward while remaining in the same process, and following a message from its sending to its reception. A logical clock provides a mechanism for determining facts about the order of events.

Causality (also referred to as causation, or cause and effect) is influence by which one event, process, state, or object (a cause) contributes to the production of another event, process, state, or object (an effect) where the cause is partly responsible for the effect, and the effect is partly dependent on the cause.

In general, a process has many causes, which are also said to be causal factors, and all lie in its past. An effect can in turn be a cause of, or causal factor for, many other effects, which all lie in its future.

A vector clock is a mechanism for capturing chronological and/or causal relationships in a distributed and/or scaleout system. Each node maintains a vector clock of logical clocks for each communicating node or each node in the system. Every time a message is exchanged, the sending node sends not only what the sending node knows about the global state, but also the state that the sending node has received from other nodes as reflected in the sending node's vector clock.

Generally, a vector clock operates using various rules. The length of the vector may change as nodes are added/removed to the system. Initially, the vector clock of each node is set to zero.

For example, if there are three nodes, the vector clock may be represented as, for nodes N1, N2, and N3: [N1, N2, N3]. From the perspective of node N1, the vector clock is initialized as [0,0,0]. Each of the entries is a logical clock of a corresponding node. The first entry represents what node N1 knows about itself and the second and third entries represent what the node N1 knows about nodes N2 and N3. When initialized, the vector clock for the node N2 is [0,0,0]. In this case, however, the first and third entries represent what the node N2 knows about the nodes N1 and N3, respectively. The second entry represents what the node N2 knows about itself. The vector clock for the node N3 is similarly initialized. Thus, entries (or logical clocks) in each of the vector clocks are set to zero (0) initially.

Once the nodes begin performing operations in the distributed system, the vector clocks may be updated as necessary using rules as follows and by way of example only:

Every time an internal event occurs on a node, the value of the node's logical clock in the vector clock is incremented by one.

Every time a node sends a message to another node, the value of the node's logical clock is incremented by one.

Every time a node receives a message, the value of the node's logical clock in the vector clock is incremented by one. In addition, other logical clocks in the vector clock are updated with the maximum value between values in the node's vector clock and values in the vector clock of the node that sent the message. Thus, each logical clock (or entry) in the node receiving the message is updated if necessary.

These rules represent vector clocks that track events. However, embodiments of the invention may use a vector clock to represent resources, such as streams. As a result, the vector clock in this example has a similar structure, but the entries represent available streams and may change based on what resources are available rather than incrementally. This representation allows failures to be identified more quickly and allow a recovery line to be established quickly. Advantageously, embodiments of the invention do not require each node to maintain the vector clocks of other nodes, which would be an example of a vector clock with multiple rows.

FIG. 1 discloses aspects of a vector clock in the context of a distributed system where the vector clock represents events rather than resources. FIG. 1 illustrates a distributed system 100 that includes nodes 102, 104, and 106. The distributed system 100 may be performing a distributed application such as a backup operation, a replication operation, or the like.

FIG. 1 also illustrates timelines 156, 158, and 160 associated with, respectively, the nodes 102, 104, and 106. The nodes 102, 104, and 106 are associated with, respectively, vector clocks 162, 164, and 166. FIG. 1 also represents the state of the vector clocks at different times. Thus, a reference to a vector clock state is a reference to the vector clock at a particular time.

FIG. 1 illustrates events that occur at each of the nodes 102, 104, and 106. Events associated with the node 102 include events 108, 110, 112, 114, and 116. A state of the vector clock is illustrated with each of the events 108, 110, 112, 114, and 116 as, respectively, vector clock states 132, 134, 136, 138, and 140.

Similarly, for the node 104, the events 118, 120, 122, 124, and 126 are associated with, respectively, vector clock states 142, 144, 146, 148, and 150. For the node 106, the events 128 and 130 are associated with, respectively, vector clock states 152 and 154.

FIG. 1 illustrates how entries the vector clocks 162, 164, and 166 of the nodes 102, 104, and 106 change in response to various events, which may include internal events, messages, and the like. As illustrated by the timeline 156, the node 102 experiences 5 events. At each event, the logical clock of the node 102 in the vector clock 162 (the first entry in the vector clock 162) is incremented by one. Thus, the vector clock state 132 illustrates that the logical clock of the node 102 is incremented to 1 at the event 108. At the event 116, the logical clock of the node 102 is incremented to 5. Similarly, the logical clock of node 104 in the vector clock 164 (the second entry in the vector clock 164) is incremented in a similar manner (incremented by one at each of the events 118, 120, 122, 124, and 126. The logical clock of the node 106 in the vector clock 166 (the third entry in the vector clock 166) is incremented by one at each of the events 128 and 130.

A message 168 (represented by an arrow in FIG. 1) represents, by way of example, a message 168 from the node 102 to the node 104 and essentially represents or corresponds to the events 110 and 120 (e.g., a replication from node 102 to node 104) at, respectively, the nodes 102 and 104. This causes the logical clock of the node 102 to be incremented from 1 to 2 as illustrated in the vector clock state 134.

The vector clock 164 of the node 104 that receives the message 168 is updated as follows. The logical clock of the node 104 (second entry in the vector clock 164) is incremented from 1 to 2 as illustrated by the vector clock state 144. Because the node 104 is receiving the vector clock 162 from the node 102, other entries in the vector clock 164 are also updated. The first entry of the vector clock 164 is updated to 2 because the first entry of the vector clock state 134 of the vector clock 162 is larger than the first entry of the vector clock state 142 of 0. Because the third entries of the vector clocks 162 and 164 are both zero, no change is made to the third entry of the vector clock 164. Thus, the vector clock 164 is updated from [0, 1, 0] to [2, 2, 0] as illustrated by the vector clock state 144.

Over time, the vector clocks change in response to events. The vector clock state at one node may differ from the vector clock state at another node. This may depend on interactions between the nodes. For example, FIG. 1 illustrates no messages between the nodes 102 and 106. However, the vector clock state 138 illustrates a 1 for the node 106. This is because of the event 122 and the event 114, which allows aspects of the vector clock 166 to be propagated to the vector clock 162.

As illustrated, the vector clocks states can be shared and allow a history or ordered events to be determined. For example, if the node 102 fails after the event 116, a rollback can be performed using the last known valid state represented by the vector clock, which is [5, 4, 1] at the time of the event 116.

Embodiments of the invention further relate to vector clock based failure recovery for a computing system performing replication. As discussed in more detail, the vector clock may represent resources or streams (a type of resource) availability. However, the vector clocks of the nodes is updated in a similar manner.

Figure 2:
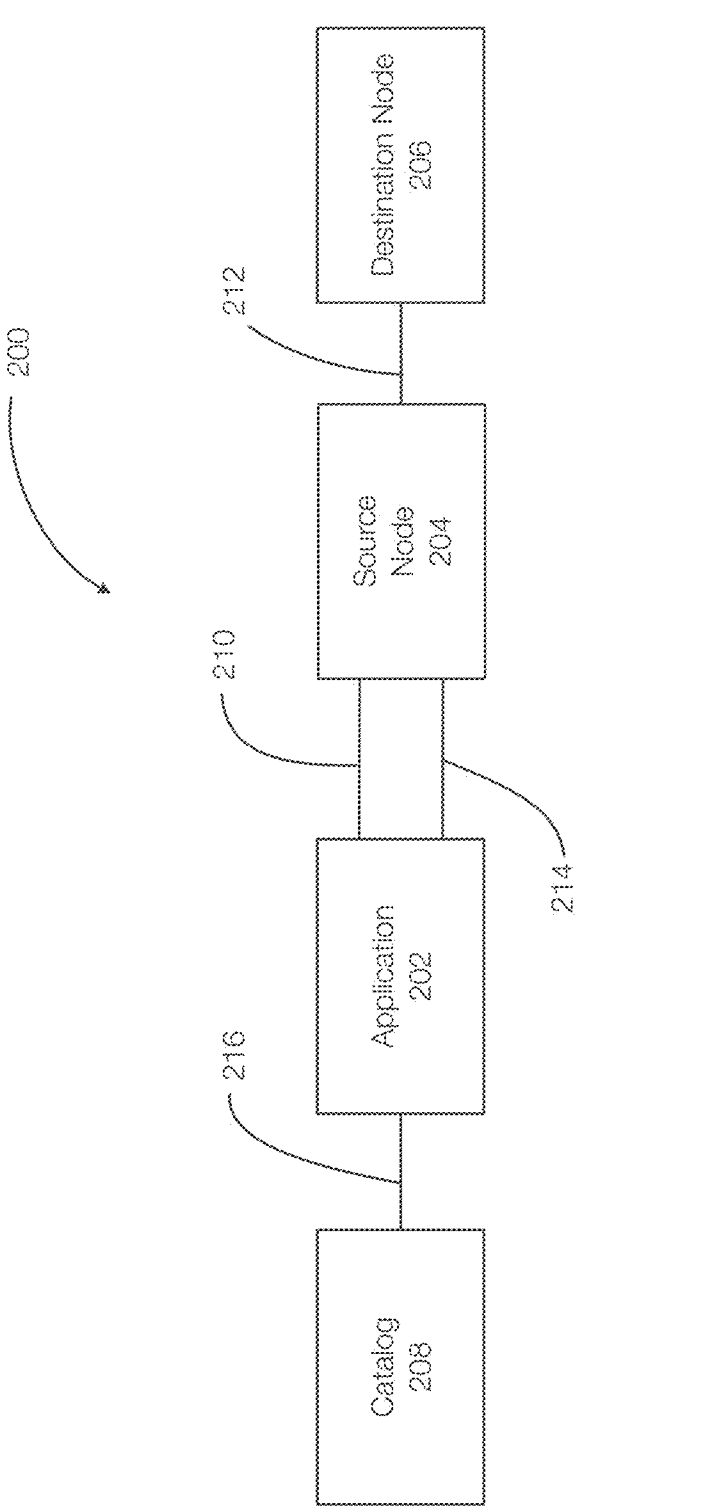
FIG. 2 discloses aspects of a distributed computing system in which distributed applications, which may include replication, are performed.

FIG. 2 discloses aspects of a distributed computing system in which operations such as stream-based replication are performed. More specifically, FIG. 2 discloses aspects of stream-based replication. In one example, data in the system 200 is replicated from a source node 204 (e.g., cluster of servers or computers, each with processor(s), memory, and the like, storage device(s), virtual machine, container) to a destination node 206 (or to multiple destination nodes). In one example, the source node 204 and the destination node 206 may be storage devices in the context of a data protection appliance or system.

The data on the source node 204 may be streamed using MFR (managed file replication) streams, Mtree based streams, or the like. To improve replication, multiple streams may be used to stream the data, such as a file. For example, a 2 GB (gigabyte) file may be replicated using 10 200 MB (megabyte) streams. The scale of transfer may vary. Thus, a 20 GB file may be replicated using 10 2 GB streams. The size of the streams may vary. For example, a directory with 6 files may be replicated using 6 streams-one stream for each file, which is independent of file size.

More specifically, the system 200 may include an application 202 that is configured to perform replication of the source node 204 (or data thereon) to the destination node 206. The application 202 may issue a file copy start command or operation 210. This allows a replication context and/or a secure connection to be established between source node 204 and the destination node 206.

Once the context and connection are established, streams may be used to transfer 212 data between the source node 204 and the destination node 206. The status may be monitored using a command such as file copy status.

When the transfer of data is completed 214, a file copy stop command or operation may be sent by the application 202. Next, the catalog 208 is updated 216. In this example, the catalog 208 may identify files (identify which nodes store specific data) such as:

1 copy on source node (file1)

2 copy on destination node (file2)

Thus, the file1 (or other data) has been replicated from the source node 104 to the destination node 106 and stored as file2 (but may have the same name and/or metadata).

As previously suggested, the replication operation may fail for various reasons. One reason relates to the availability of streams. In this example, the source node 204 may be associated with read streams and the destination node 206 may be associated with write streams. The number of read streams on the source node 204 and write streams on the destination node 206 may be limited and may be different. Exceeding these limits may degrade performance. For example, throughput and compression performance may degrade.

In one example, the nodes may be associated with a soft stream limit and a hard stream limit. Exceeding the soft stream limits may degrade performance. The hard stream limits cannot be exceeded. When the soft stream limit is exceeded, a system or node (e.g., the server on which the application 202 resides and operates), may attempt to recycle streams in order to remain under the hard limit. If the hard limit is exceeded, stream recycling may become severe and may impact performance significantly. Often, this generates an alert such as "too many streams open".

For streams (e.g., managed file replication (MFR) streams), the limits are recommended values and not enforced. An 'out of stream' error or 'too many streams open' error may be logged when streams are exceeded. In one example, recommended values for a number of supported streams may be obtained or determined and the application 202 may attempt to set replication jobs or operations within these limits. Failure may still occur.

In one example, the node 204 may return an error to the application 202 if the stream limit is reached and/or exceeded. However, if the stream limit on the destination node 206 is exceeded, there is no mechanism to return the error to the application 202. The error may be logged on the destination node 206. However, the application 202 may continue to start replication jobs, now knowing that the destination node 206 is running out of streams or is out of streams. Over time, if the out of stream limit persists at the destination node 206, replication jobs will fail and this may lead to a performance decrease at the source node 204 and elsewhere in the distributed system.

Embodiments of the invention relate to a vector clock that is configured to communicate available stream counts at source and/or destination nodes. These counts may be piggybacked to a message passing an event between the source node 204 and the destination node 206. Both the source node 204 and the destination node 206 keep the available stream counts in the vector clock at any given point in time. As previously mentioned, some of the logical clocks may not be current. Generally, at each node, the node's corresponding logical clock is current.

Embodiments of the invention help prevent and/or recover from this type of replication failure (e.g., not enough streams or out of streams) for automatic multi-streaming support (AMS) optimization for managed file replication. The advantage of AMS optimization is that AMS uses multiple streams to send data from the source node 204 to the destination node 206. AMS optimization splits a large file into smaller file segments. Source sends the file segments across multiple streams. At the destination node 206, the file segments are re-assembled to recreate the single file as previously stated.

Embodiments of the invention further relate to a vector clock for handling out of stream errors on the source node 204 and/or the destination node 206. Embodiments of the invention may be implemented such that the application 202 is unaware of the streams used/available by the source node and/or the destination node. Embodiments of the invention further enable recovery from out of stream failures and resume operations from the point of failure or from a recovery line. This allows the replication system and operations to be self-healing.

Embodiments of the invention relate to a logical vector clock configured to keep a point in time state of the resource/stream allocations or availability and the progress of a replication operation or job. This may allow, for example, streams to be queued and the like such that a replication job is subject to stream availability at the source node and/or the destination node. On failure, a recovery line can be established and, when streams are available, the job can progress or proceed from the established recovery line.

Figure 3:
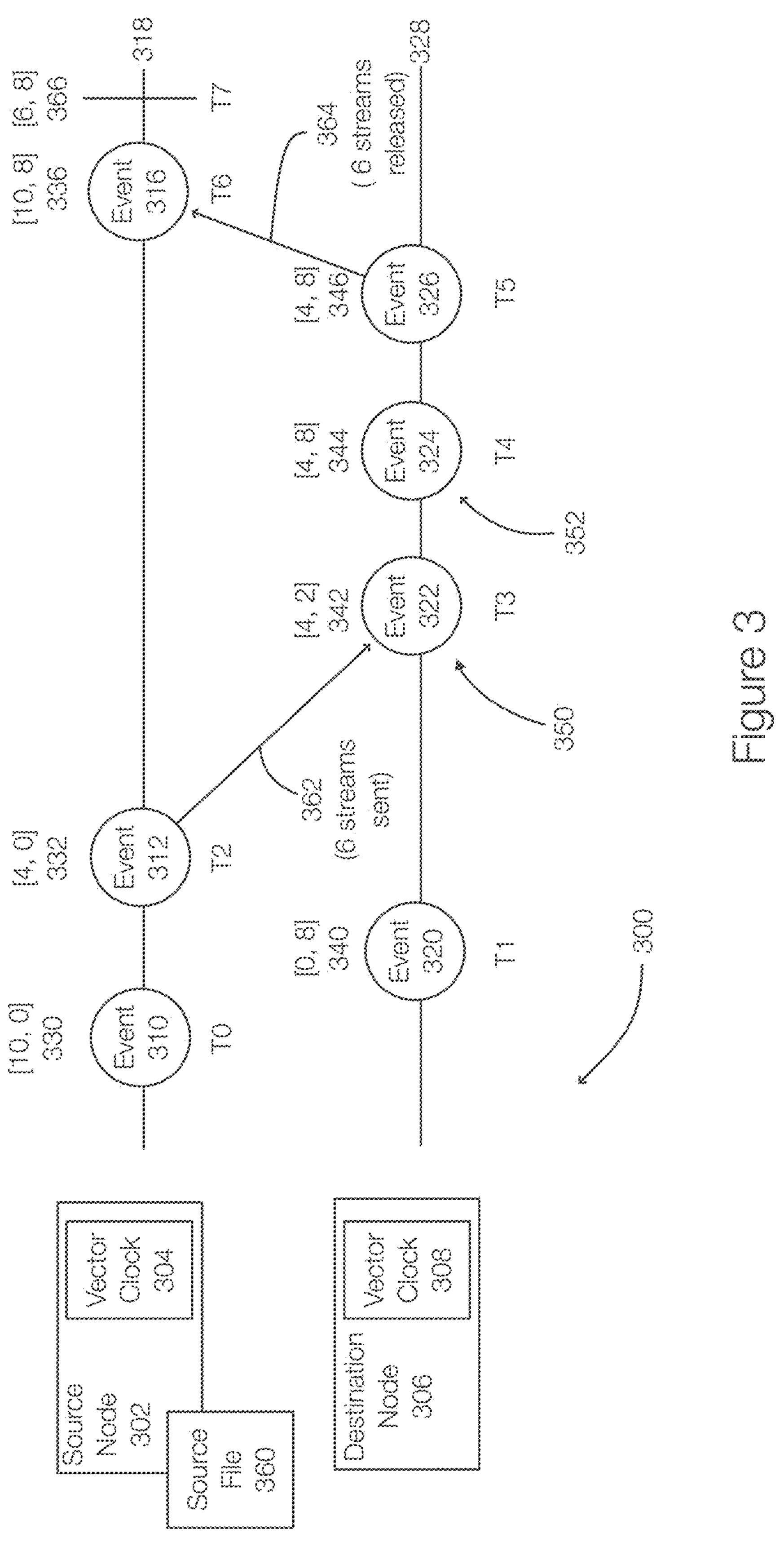
FIG. 3 discloses aspects of failure recovery using vector clocks.

FIG. 3 discloses aspects of failure recovery in a distributed computing system. As previously stated, a vector clock is a mechanism that captures chronological and causal relationships in a distributed system. FIG. 3 discloses aspects of a vector clock configured for resource usage (e.g., replication streams) and/or failure recovery.

FIG. 3 illustrates a source node 302 associated with a vector clock 304 and a destination node 306 associated with a vector clock 308. In this example, each of the vector clocks includes 2 entries: {N1, N2}. Because entries in the vector clock change over time, reference to a vector clock state is simply a reference to the vector clock at a particular time. Further, as more nodes are added (system scaling), entries may be added to the vector clocks in the system.

In this example, the vector clocks 304 and 308 are configured to store or represent the number of streams available at each node. In this example, the source node 302 wants to send/replicate a 20 GB file (source file 360) to the destination node 306. In this example, the source file 360 may be chunked or divided into 10 smaller 2 GB files that can be transmitted using different streams (e.g., 10 streams). The source file 360 will be reconstructed at the destination node 306 from the 10 smaller files. At time T0, the vector clock 304 represents that 10 streams are available at the source node 302 and 0 streams are available at the destination node 306, as illustrated in the vector clock state 330. Stated differently, an application may access the vector clock state 330 and determine that 10 streams are available for transmitting the source file 360. Alternatively, the application may simply provide a replication job and the source node may be responsible for executing the replication job. Because the vector clock is updated with information from other nodes when messages are received from the other nodes, the logical clocks of other nodes in the vector clock 304 may not be up to date.

At time T1, vector clock state 340 of the node 306 indicates that 8 streams are available at the destination node 306. Thus, the destination node 306 is able to accept 8 streams at time T1.

At time T2, the source node 302 decides to send 6 streams (of the 10 streams required for the source file 360) and queue the remaining 4 streams. A message 362 that a replication job with 6 streams is sent to the destination node 306 and the request 362 is piggybacked to the message. Because 6 streams are sent or requested, the vector clock 304 is updated to the vector state 332, which shows that 4 streams are available at the source node 302. Thus, the vector clock state 332 indicates that four streams are available at the source node 302 because 6 streams are being used for the replication job. The source node 302 can send any number of streams up to 10 streams in this example.

At time T3, the message 362 is received at the destination node 306, which indicates that 6 streams are required by the source node 302. However, at time T3, the vector clock state 342 demonstrates that only 2 streams are now available at the destination node 306. The vector state clock 342 ([4, 2]) indicates that 6 streams are available at the source node 302. In light of receiving the message, the vector clock 308 is also updated to the vector clock state 342 of [4, 2] to reflect that 4 streams are available at the source node 302.

The message 362 or replication job results, in one example, in a failure or error of "out of streams" because the replication job sent by the source node 302 requires 6 streams and only 2 streams are available (e.g., the other 6 streams previously available at the destination node, as reflected in the vector clock state 340, are in use by another node) at time T3. The vector clocks 304 and 308, however, allow for a recovery line to be established at this point. To overcome this failure, the destination node 306 may perform a throttling action to prevent all 6 streams from being transmitted by the source node 302. In one example, the destination node 306 throttles the replication job until 6 streams are available at the destination node 306 for the 6 streams requested by the source node 302. Thus, the event 322 is associated with a failure 350 and a recovery line is established to reflect that the job is not completed.

Eventually, streams in use at the destination node 306 are released and, at time T4, the vector clock state 344 is updated to indicate that 8 streams are available at the destination node 306. The 6 streams from the source node 302 are allowed to proceed at time T4 and the vector clock 308 will be updated to [4, 2]. Thus, the event 324 represents a self-healing recovery from the replication failure. In this example, the recovery may begin at about T4 once the streams needed for the replication job from the source node 302 are available. Initiating the recovery 352 causes the vector node to change to [4, 2] at the destination node 360. Alternatively, the destination node 306 may allocate the 2 streams available at the destination node 306 at time T3 and then throttle the source node 302 until at least 4 streams are available at the destination node 306. The vector clock 308 is updated accordingly.

At time T5, the vector clock state 346 indicates that the 6 streams previously used by the source node 302 have been released and that 8 streams are available at the destination node 306. The replication job is completed and the 6 streams are released when the replication job is completed.

At time T5, the replication job is completed and 12 GB have been successfully delivered to the destination node 306 and the vector clock state 308 transitions to [4, 8] indicating that 8 streams are again available at the destination node 306. When the replication job is completed, a message 364 is transmitted to the source node 302. The message may indicate that 8 streams are available at the destination node 306.

In response to the message 364, the vector clock 308 is updated to reflect that 8 streams are available at the destination node 306 and 10 streams are available at the source node 302 as the 6 streams have been completed as illustrated by the vector clock state 336.

The source node 302 still needs 4 streams at the source node 302 to transmit the remaining 4 streams of the original 10 stream. The vector clock state 336 indicates that 10 streams are available. The source node 302 may send a message to transmit the remaining 4 streams. Thus, the 4 streams are transmitted (assuming that at least 4 streams are still available at the destination node 306). The vector clock 304 is then updated to reflect that 6 streams are available as only 4 of the available 10 are being used in this example at time T7 as illustrated by the vector clock 366.

A recovery line can be established such that, when the streams are available, the replication operation can proceed from the failure recovery line. Stated differently, the destination node 306 can resume the replication operation when the number of streams available at the destination node 306 is greater than or equal to the number of streams required by the source node 302.

Advantageously, the application performing the replication is unaware of the of the stream/resource requirements/availability. Embodiments of the invention are further self-healing and can automatically recover from at least an out of streams failure.

Figure 4:
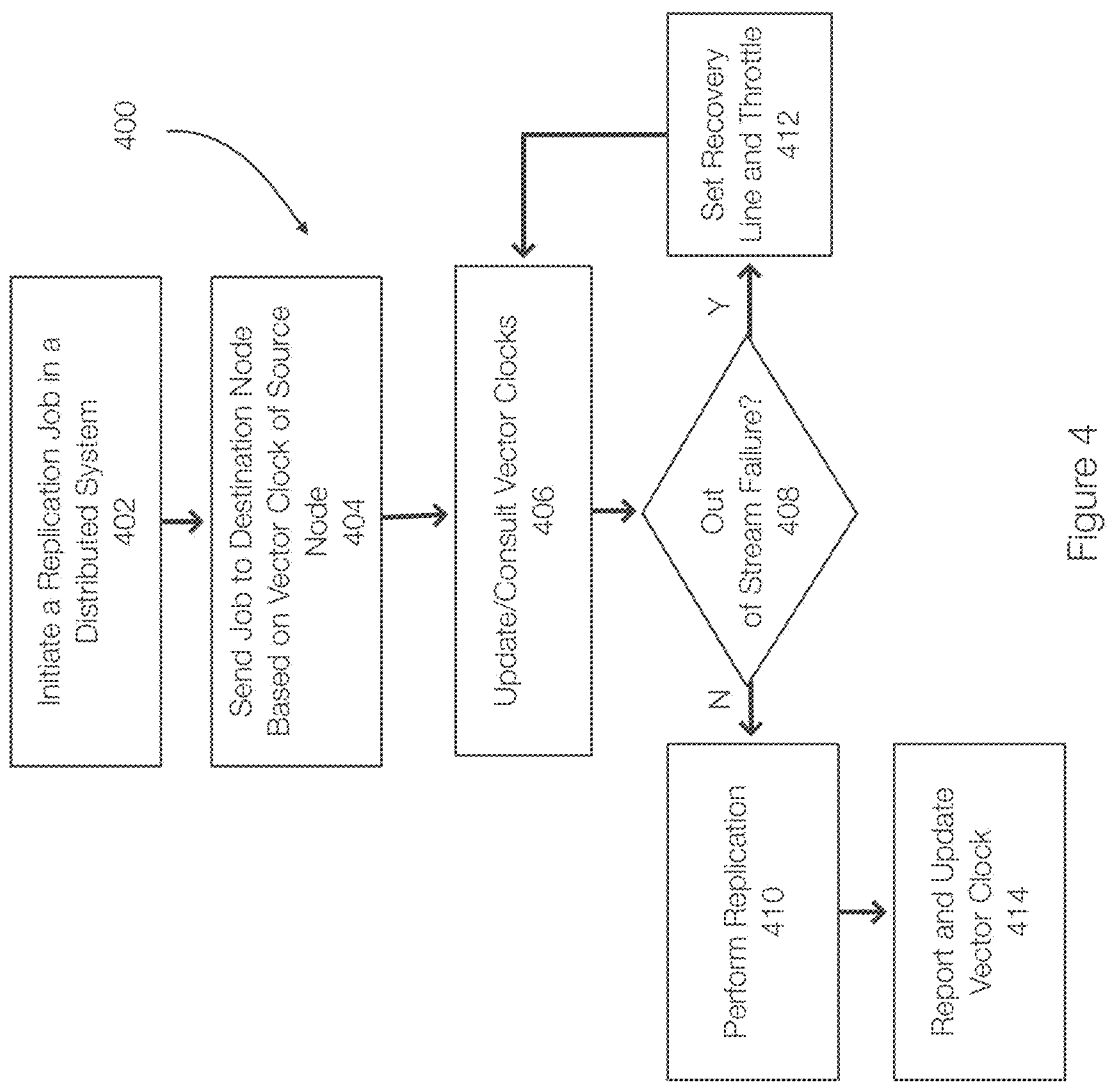
FIG. 4 discloses aspects of a replication operation including failure recovery.

FIG. 4 discloses aspects of performing a replication operation and/or failure recovery operations. The method 400 may include initiating 402 a replication job. The replication job may be initiated by an application at a source node or associated with a source node and may be directed to a destination node. The source node and the vector node are each associated with a vector clock. In one example, entries (logical clocks) in the vector clock represent streams available at corresponding nodes in the computing system.

The replication job includes, in one example, the source node consulting its vector clock. In some instances, the logical clock in the source node's vector clock for the destination node may not be up to date. However, the replication job is generated based on streams available at the source node in one example.

The replication job is sent 404 to the destination node based on the logical clock of the source node in the source node's vector clock. Sending the replication job may include sending the number of streams the source node would like to consume. Once the replication job is sent, the source node updates 406 its vector clock.

The destination node receives the request (e.g., a message) and consults its vector clock to determine whether there is an out of streams error, which results in a failure when out of streams. At this point of the replication job, in one example, the vector clock of the source node has not been updated with the logical clock of the destination node. This occurs when the replication job is completed in one example.

Thus, the destination node determines whether an out of stream failure has occurred 408. If the destination node has sufficient streams available (N at 408), the replication is performed 410. Once completed, the destination node reports 414 (e.g., sends a message) to the source node and the source node and destination nodes update their corresponding vector clocks.

If there is an out of stream failure (Y at 408), a failure has occurred and a recovery line is set 412. The recovery line is, in one example, the request from the source node which is being throttled at the destination node. Once sufficient streams are available at the destination node, throttling is removed and the replication job is performed starting from the recovery line. In one example, if the destination node elects to not perform the replication until streams are available to fully satisfy the request, the recovery line is to replicate all of the streams.

For example, a source node needing 10 streams may request any amount of streams up to the number of streams available at the source node based on the source node's vector clock. This may be done regardless of the value of the logical clock of the destination node in the source node's vector clock. Throttling occurs when the destination node does not have enough streams to satisfy the source node's request.

If streams are available for replication at the destination node, streams are allocated to the source node at the destination node. This may include allocating all of the requested streams, allocating a portion of the requested streams and throttling the other streams, or allocating none of the requested streams until the request as a whole can be granted.

Once streams are available and allocated, the data is replicated using streams from the source node to the destination node. If a failure occurs (e.g., not enough streams available), the destination node may throttle the streams or the replication. Once the replication is completed, a catalog may be updated such that the catalog identifies which nodes contain a copy of the data that has been replicated.

With respect to the replication operation, the replication request may be viewed as an event and, when the event occurs, vector clocks may be updated. Vector clocks may be updated when messages are sent, acknowledged, jobs are initiated, jobs are completed, or the like. Generally, a system may update vector clocks in a similar manner/timing at each of the nodes.

It is noted that embodiments disclosed herein, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, data protection operations, replication operations, failure recovery operations, throttling operations, vector clock and vector clock related operations, or the like or combinations thereof. More generally, the scope of this disclosure embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data protection functionality for one or more clients. Another example of a cloud computing environment is one in which processing, data storage, data protection, and other services may be performed on behalf of one or more clients. Some example cloud computing environments in which embodiments may be employed include Microsoft Azure, Amazon AWS, Dell EMC Cloud Storage Services, and Google Cloud. More generally however, the scope of this disclosure is not limited to employment of any particular type or implementation of cloud computing environment.

In addition to the cloud environment, the operating environment may also include one or more clients capable of collecting, modifying, and creating, data. As such, a particular client or server or other computing system may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, servers and clients, for example, may likewise take the form of software, physical machines, containers, or virtual machines (VMs), though no particular component implementation is required for any embodiment.

As used herein, the term 'data' or 'object' is intended to be broad in scope. Example embodiments are applicable to any system capable of storing and handling various types of objects, in analog, digital, or other form. Synthetic documents and/or corresponding labels are examples of data or objects. An object may be a portion of a document image.

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments. These are presented only by way of example and are not intended to limit the scope of this disclosure or the claims in any way.

Embodiment 1. A method comprising: initiating a replication job for an application to replicate data from a source node to a destination node, wherein the source node is associated with a first vector clock and the destination node is associated with a second vector clock, wherein a first entry in the first and second vector clocks is a logical clock of the source node and a second entry in the first and second vector clocks is a logical clock of the destination node, determining, by the source node, a number of streams for replicating the data based on the first entry in the first vector clock, sending a message to the destination node identifying the number of streams, consulting, by the destination node, the second vector clock and determining a failure when the number of nodes is greater than the second entry in the second vector clock, and performing the replication job when the failure is not determined and throttling the replication job when the failure is determined.

Embodiment 2. The method of embodiment 1, further comprising updating the first entry of the first vector clock at the source node.

Embodiment 3. The method of embodiment 1 and/or 2, further comprising setting a recovery line when the failure is determined, wherein the recovery line corresponds to the replication job and refers to streams that are throttled at the destination node.

Embodiment 4. The method of embodiment 1, 2, and/or 3, further comprising, when determining the failure, allocating streams available at the destination node to the replication job and throttling remaining requested streams.

Embodiment 5. The method of embodiment 1, 2, 3, and/or 4, further comprising, when determining the failure, throttling all requested streams until sufficient streams to satisfy all requested streams are available at the destination node.

Embodiment 6. The method of embodiment 1, 2, 3, 4, and/or 5, further comprising completing the replication job and sending a message to the source node, wherein the source node updates the first vector clock based on the message.

Embodiment 7. The method of embodiment 1, 2, 3, 4, 5, and/or 6, further comprising updating a catalog that identifies that both the first node and the second node have the data.

Embodiment 8. The method of embodiment 1, 2, 3, 4, 5, 6, and/or 7, wherein the vector clock comprises a single entry for each node in the computing system, wherein entries in the vector clock are scaled based on scaling of nodes in the computing system.

Embodiment 9. The method of embodiment 1, 2, 3, 4, 5, 6, 7, and/or 8, wherein the first vector clock and the second vector clock are not required to be identical, wherein the first vector clock is updated when an event occurs on the source node and when the first node sends a message to another node, wherein each node that receives a message updates their corresponding vector clock.

Embodiment 10. The method of embodiment 1, 2, 3, 4, 5, 6, 7, 8, and/or 9, wherein the application is unaware of stream availability at the source node and the destination node and wherein the failure is self-healing.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 5:
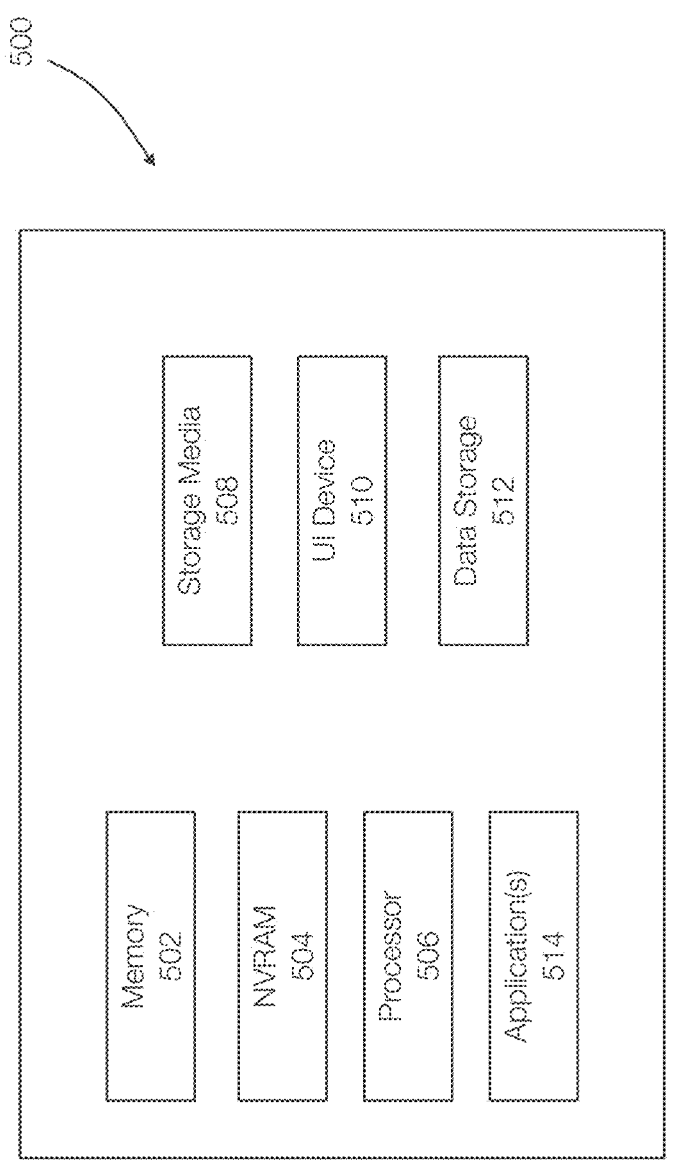
FIG. 5 discloses aspects of a computing device, system, or entity.

With reference briefly now to FIG. 5, any one or more of the entities disclosed, or implied, by the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

The device 500 may also represent a computing system such as a server or set of servers, an edge based computing system, a cloud-based computing system, or the like. The computing system may be localized or distributed in nature.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 500 may also represent a physical or virtual machine or server, an edge-based computing system, a cloud-based computing system, server clusters or other computing systems or environments. The device 500 may also represent multiple machines or devices, whether virtual, containerized, or physical. The device 500 may perform or execute steps or acts of the methods illustrated in the Figures.

The device 500 may represent a cloud-based system, an edge-based, system, an on-premise system, or combinations thereof. Curation operations, alignment operations, verification operations, user interface related operations, or the like may be performed using these types of computing environments/systems.

The described embodiments are to be considered in all respects only as illustrative and not restrictive. All changes which come within the meaning and range of equivalency of the claims are to be embraced within their scope.

What is claimed is:

1. A method comprising:

initiating a replication job for an application to replicate data from a source node to a destination node, wherein the source node is associated with a first single row vector clock and the destination node is associated with a second single row vector clock, wherein a first entry in the first and second single row vector clocks is a logical clock of the source node and a second entry in the first and second single row vector clocks is a logical clock of the destination node;

determining, by the source node, a number of streams for replicating the data based on the first entry in the first single row vector clock;

sending a message to the destination node identifying the number of streams;

consulting, by the destination node, the second single row vector clock and determining a failure when the number of streams is greater than the second entry in the second single row vector clock; and performing the replication job when the failure is not determined and throttling the replication job when the failure is determined, wherein each single row vector clock comprises a single entry for each node.

2. The method of claim 1, further comprising updating the first entry of the first single row vector clock at the source node.

3. The method of claim 1, further comprising setting a recovery line when the failure is determined, wherein the recovery line corresponds to the replication job and refers to streams that are throttled at the destination node.

4. The method of claim 1, further comprising, when determining the failure, allocating streams available at the destination node to the replication job and throttling remaining requested streams.

5. The method of claim 1, further comprising, when determining the failure, throttling all requested streams until sufficient streams to satisfy all requested streams are available at the destination node.

6. The method of claim 1, further comprising completing the replication job and sending a message to the source node, wherein the source node updates the first single row vector clock based on the message.

7. The method of claim 6, further comprising updating a catalog that identifies that both the source node and the destination node have the data.

8. The method of claim 1, wherein entries in each single row vector clock are scaled based on scaling of nodes.

9. The method of claim 1, wherein the first single row vector clock and the second single row vector clock are not required to be identical, wherein the first single row vector clock is updated when an event occurs on the source node and when the source node sends a message to another node, and wherein each node that receives a message updates their corresponding single row vector clock.

10. The method of claim 1, wherein the application is unaware of stream availability at the source node and the destination node and wherein the failure is self-healing.

11. A non-transitory storage medium having stored therein instructions that are executable by one or more hardware processors to perform operations comprising:

initiating a replication job for an application to replicate data from a source node to a destination node, wherein the source node is associated with a first single row vector clock and the destination node is associated with a second single row vector clock, wherein a first entry in the first and second single row vector clocks is a logical clock of the source node and a second entry in the first and second single row vector clocks is a logical clock of the destination node;

determining, by the source node, a number of streams for replicating the data based on the first entry in the first single row vector clock;

sending a message to the destination node identifying the number of streams;

consulting, by the destination node, the second single row vector clock and determining a failure when the number of streams is greater than the second entry in the second single row vector clock; and performing the replication job when the failure is not determined and throttling the replication job when the failure is determined, wherein each single row vector clock comprises a single entry for each node.

12. The non-transitory storage medium of claim 11, further comprising updating the first entry of the first single row vector clock at the source node.

13. The non-transitory storage medium of claim 11, further comprising setting a recovery line when the failure is determined, wherein the recovery line corresponds to the replication job and refers to streams that are throttled at the destination node.

14. The non-transitory storage medium of claim 11, further comprising, when determining the failure, allocating streams available at the destination node to the replication job and throttling remaining requested streams.

15. The non-transitory storage medium of claim 11, further comprising, when determining the failure, throttling all requested streams until sufficient streams to satisfy all requested streams are available at the destination node.

16. The non-transitory storage medium of claim 11, further comprising completing the replication job and sending a message to the source node, wherein the source node updates the first single row vector clock based on the message.

17. The non-transitory storage medium of claim 16, further comprising updating a catalog that identifies that both the source node and the destination node have the data.

18. The non-transitory storage medium of claim 11, wherein entries in each single row vector clock are scaled based on scaling of nodes.

19. The non-transitory storage medium of claim 11, wherein the first single row vector clock and the second single row vector clock are not required to be identical, wherein the first single row vector clock is updated when an event occurs on the source node and when the source node sends a message to another node, and wherein each node that receives a message updates their corresponding single row vector clock.

20. The non-transitory storage medium of claim 11, wherein the application is unaware of stream availability at the source node and the destination node and wherein the failure is self-healing.

* * * * *